(12) United States Patent
Tsukamoto et al.

(10) Patent No.: US 11,091,205 B2
(45) Date of Patent: Aug. 17, 2021

(54) REAR VEHICLE-BODY STRUCTURE

(71) Applicant: MAZDA MOTOR CORPORATION, Hiroshima (JP)

(72) Inventors: Hideyuki Tsukamoto, Aki-gun (JP); Kouji Matsushita, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 70 days.

(21) Appl. No.: 16/745,965

(22) Filed: Jan. 17, 2020

(65) Prior Publication Data

US 2020/0231219 A1 Jul. 23, 2020

(30) Foreign Application Priority Data

Jan. 23, 2019 (JP) .............................. JP2019-009650

(51) Int. Cl.
| | |
|---|---|
| *B60J 7/00* | (2006.01) |
| *B62D 25/08* | (2006.01) |
| *B62D 21/02* | (2006.01) |
| *B62D 21/08* | (2006.01) |
| *B62D 25/20* | (2006.01) |

(52) U.S. Cl.
CPC ............. *B62D 25/08* (2013.01); *B62D 21/02* (2013.01); *B62D 21/08* (2013.01); *B62D 25/20* (2013.01)

(58) Field of Classification Search
CPC ............. E21D 23/0034; E21D 23/0481; E21D 23/085; E21C 27/34; Y10T 428/23979; A61M 2005/14553; A61M 2205/581; A61M 2205/582; A61M 2205/583; A61M 5/14546

See application file for complete search history.

(56) References Cited

U.S. PATENT DOCUMENTS

| | | | | |
|---|---|---|---|---|
| 5,110,177 | A | * | 5/1992 | Akio ..................... B62D 21/11 280/784 |
| 2016/0083011 | A1 | * | 3/2016 | Kawaguchi ............ B62D 21/02 296/203.01 |
| 2016/0090124 | A1 | * | 3/2016 | Kaneko ................. B62D 21/11 296/203.04 |
| 2017/0073019 | A1 | * | 3/2017 | Kabayama ........... B62D 21/155 |
| 2018/0170433 | A1 | * | 6/2018 | Salmons ............ B62D 25/2036 |
| 2019/0061830 | A1 | * | 2/2019 | Fujisawa .............. B62D 25/025 |
| 2020/0062310 | A1 | * | 2/2020 | Wang .................... B62D 21/152 |
| 2020/0070897 | A1 | * | 3/2020 | Xiao ..................... B62D 27/023 |

(Continued)

FOREIGN PATENT DOCUMENTS

JP 2013-163470 A 8/2013

*Primary Examiner* — Kiran B Patel
(74) *Attorney, Agent, or Firm* — Studebaker & Brackett PC

(57) ABSTRACT

A rear vehicle-body structure comprises a floor of the vehicle-body, a right-and-left rear frame extending in a vehicle longitudinal direction on both-sides of a rear of the floor, a rear cross member extending in a vehicle width direction and interconnecting a front of the right-and-left rear frame, and a right-and-left reinforcing member directly or indirectly connecting a tunnel portion provided in front of the rear cross member. The right-and-left reinforcing member is provided on the floor so as to extend forwardly and inwardly in the vehicle width direction from the rear cross member toward the tunnel portion, and respective front end portions of the right-and-left reinforcing member overlap each other and are joined to the floor.

12 Claims, 6 Drawing Sheets

(56) References Cited

U.S. PATENT DOCUMENTS

| | | | |
|---|---|---|---|
| 2020/0102014 A1* | 4/2020 | Sakai | B60R 19/34 |
| 2020/0231216 A1* | 7/2020 | Choi | B62D 21/11 |
| 2020/0231219 A1* | 7/2020 | Tsukamoto | B62D 21/02 |
| 2020/0231221 A1* | 7/2020 | Tsukamoto | B62D 25/2027 |
| 2020/0269922 A1* | 8/2020 | Kiyoshita | B62D 21/11 |
| 2020/0269928 A1* | 8/2020 | Ishimoto | B62D 25/04 |
| 2020/0269930 A1* | 8/2020 | Kiyoshita | B62D 25/087 |
| 2021/0061081 A1* | 3/2021 | Kodama | B62D 25/2027 |

* cited by examiner

REAR VEHICLE-BODY STRUCTURE

BACKGROUND

Technical Field

The present disclosure relates to a rear vehicle-body structure of a vehicle, such as an automotive vehicle.

Background Art

In general, it is required in the rear vehicle-body structure of the vehicle, such as the automotive vehicle, that a collision load inputted from a vehicle-body rear part is smoothly transmitted to a vehicle-body front part. Accordingly, it is preferable that a load transmission path (hereafter, referred to as "load path") where the collision load is transmitted from the vehicle-body rear part to the vehicle-body front part which has the higher rigidity be created.

For example, Japanese Patent Laid-Open Publication No. 2013-163470 discloses a rear vehicle-body structure which comprises a pair of right-and-left rear frames which extend in a vehicle longitudinal direction on both-side portions of a vehicle-body rear part, a pair of right-and-left suspension housings which support a pair of rear suspensions provided on an outward side, in a vehicle width direction, of the rear frames, and a pair of right-and-left reinforcing members which connect the suspension housings and a floor tunnel provided in front of the suspension housings.

In the structure of Japanese Patent Laid-Open Publication No. 2013-163470, each of the above-described reinforcing members extends obliquely forwardly-and-inwardly, in the vehicle width direction, from each of the suspension housings. Thereby, the load path where the load transmitted to the suspension housing from the rear suspension is transmitted to the tunnel portion by way of the reinforcing member is created.

Further, in the structure of Japanese Patent Laid-Open Publication No. 2013-163470, respective front end portions of the above-described reinforcing members are connected by a connecting member. Thereby, improvement of the rigidity and strength of a connection portion of the reinforcing members to the floor tunnel is achieved.

Herein, there is a case where a vehicle provided with front-and-rear seats comprises a front floor on which the front seat is placed, a step-up portion (kick-up portion) which extends obliquely upwardly-and-rearwardly from a rear edge of the front floor, and a rear floor which extends rearwardly from an upper edge of the step-up portion and on which the rear seat is placed. In this kind of vehicle, it is required that a structure between the rear floor and the rear seat is made simple and compact in order to secure a sufficiently-wide living space of the rear seat in a vehicle vertical direction.

However, in a case where the front end portions of the pair of reinforcing members are connected via the connecting member like the structure of Japanese Patent Laid-Open Publication No. 2013-163470, it may be unavoidable to make a connection structure complex and large sized in order to secure the appropriate rigidity and strength of the above-described connecting member. Therefore, if the rear seat is disposed above the reinforcing members and the connecting member, it is forcibly required that the living space of the rear seat becomes improperly narrow in the vehicle vertical direction or the thickness of a seat cushion of the rear seat is improperly reduced.

Herein, in the vehicle disclosed in Japanese Patent Laid-Open Publication No. 2013-163470, since no rear seat is provided and therefore a restriction condition regarding the above-described living space may be relatively moderate, it is likely that the reinforcing members and the connecting member which are respectively thick and large-sized can be disposed in a floor shape.

SUMMARY

Accordingly, the present disclosure provides a rear vehicle-body structure which can firmly connect a right-and-left reinforcing member for creating the load path of the collision load from the vehicle-body rear part and also make the structure of the connecting member properly simple and compact.

The present disclosure is a rear vehicle-body structure comprising a floor of the vehicle-body, a right-and-left rear frame extending in a vehicle longitudinal direction on both sides of a rear of the floor, a rear cross member extending in a vehicle width direction and interconnecting respective a front of the right-and-left rear frame, and a right-and-left reinforcing member directly or indirectly connecting a tunnel portion provided in front of the rear cross member. The right-and-left reinforcing member is provided on the floor so as to extend forwardly and inwardly in the vehicle width direction from the rear cross member toward the tunnel portion, and respective front end portions of the right-and-left reinforcing member overlap each other and are joined to the floor.

According to the present disclosure, the right-and-left reinforcing member interconnecting the rear cross member and the vehicle-body structure body provided in front of the rear cross member is connected at the overlap joint section provided at the front end. Accordingly, a connection portion of the right-and-left reinforcing member can be made properly simple and compact without using any other parts, such as the connecting member. Thereby, the connection portion of the right-and-left reinforcing member where the respective collision loads transmitted from the vehicle-body rear part to the right-and-left reinforcing member join can be strengthened and also the flexibility of layout of parts and the like which are arranged around this connection portion can be improved. Thus, in a case where the rear seat is arranged above the right-and-left reinforcing member, it is likely that the living space of the rear seat and the thickness, in the vehicle vertical direction, of the seat cushion of the rear seat can be secured sufficiently.

Meanwhile, in a case where the collision load is inputted from the vehicle-body rear part, the collision load is transmitted from the rear frames to the right-and-left reinforcing member through the rear cross member. Herein, an inward element, in the vehicle width direction, of the load, in addition to a forward element of the load, acts on a joining section of the right-and-left reinforcing member extending obliquely forwardly-and-inwardly from the rear cross member toward the vehicle-body structure body.

A vehicle-width-directional element of the load can be transmitted between the right-and-left reinforcing member through the overlap joint section. Accordingly, the vehicle-width-directional element of the load can be dispersed or offset (cancelled) between the right-and-left reinforcing member.

In an embodiment of the present disclosure, the reinforcing member comprises a body portion which forms a closed cross section between the floor and the body portion and a flange portion which is provided along a lower edge portion of the body portion and joined to the floor, and the overlap joint section of the right-and-left reinforcing member is formed at least at the flange portions of the reinforcing member.

According to this embodiment, the connection portion of the right-and-left reinforcing member can be formed by the two flange portions of the reinforcing member simply and compactly.

In another embodiment of the present disclosure, a front end of the body portion of the right-and-left reinforcing member are provided with opposed-face portions which face each other in the vehicle width direction, and the overlap joint section of the right-and-left reinforcing member includes a part of the flange portions which extend in the vehicle longitudinal direction along the opposed-face portions.

According to this embodiment, front end portions of the right-and-left reinforcing member can be arranged closely to each other, having a gap between the respective opposed-face portions, and also the overlap joint section of the right-and-left reinforcing members can be configured to be properly long, in the vehicle longitudinal direction, along the opposed-face portions. Thereby, the reinforcing member can be connected compactly and firmly.

In another embodiment of the present disclosure, the overlap joint section of the reinforcing member is configured to be longer than the opposed-face portions in the vehicle longitudinal direction.

According to this embodiment, the respective flange portions of the right-and-left reinforcing member are joined together in an area which is longer, in the vehicle longitudinal direction, than the opposed-face portions of the body portion of the right-and-left reinforcing member, so that the connection strength of the right-and-left reinforcing member can be effectively increased.

In another embodiment of the present disclosure, the floor comprises a vertical-face part which is provided in front of the rear cross member so as to cross the vehicle longitudinal direction and a rear floor part which extends rearwardly from an upper edge portion of the vertical-face part and supports the rear cross member and the right-and-left reinforcing member. The vehicle-body structure body extends forwardly from the vertical-face part of the floor. The front end portion of the right-and-left reinforcing member is provided with a downward-extension portion which extends downwardly along the vertical-face part of the floor and is joined to the vertical-face part of the floor, and the overlap joint section of the right-and-left reinforcing member is joined to the floor over a range from the rear floor part to the vertical-face part.

According to this embodiment, the collision load inputted from the vehicle-body rear part can be efficiently transmitted to the right-and-left rear frames, the rear cross member, the right-and-left reinforcing member, and the vehicle-body structure body extending forwardly. Further, since the overlap joint section where the respective collision loads transmitted through the right-and-left reinforcing member join is provided to cross over a corner portion between the rear floor part and the vertical-face part, the rigidity of the overlap joint section is increased effectively. Thereby, the load transmission from the right-and-left reinforcing member to the vehicle-body structure body can be achieved efficiently by way of the overlap joint section having the high rigidity.

In another embodiment of the present disclosure, the rear vehicle-body structure further comprises a second cross member extending in the vehicle width direction along a front face of the vertical-face part of the floor, passing over the vehicle-body structure body, and the downward-extension portion is connected to the vehicle-body structure body via the second cross member.

According to this embodiment, the load transmission from the right-and-left reinforcing member to the vehicle-body structure body can be achieved efficiently by way of the second cross member having the high rigidity.

The present disclosure will become apparent from the following description which refers to the accompanying drawings.

DETAILED DESCRIPTION

Hereafter, a rear vehicle-body structure 1 according to an embodiment of the present disclosure will be described.

Figure 1:
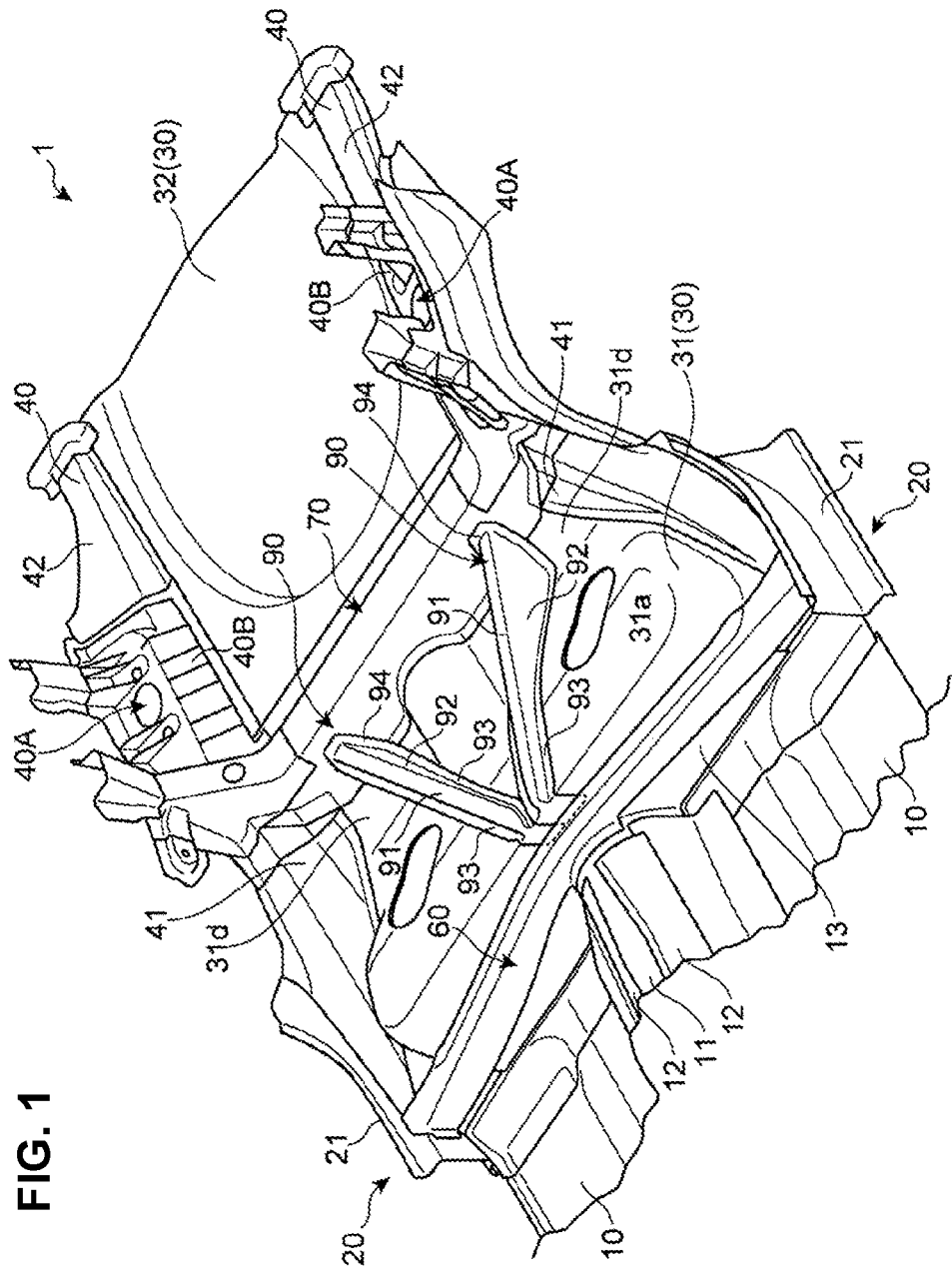
FIG. 1 is a perspective view showing a rear vehicle-body structure according to an embodiment of the preset embodiment.

As shown in FIG. 1, a floor panel 10 which forms a floor surface of a cabin and a pair of right-and-left side sills 20 which extend in a vehicle longitudinal direction and are joined to both-side edge portions, in a vehicle width direction, of the floor panel 10 are provided at a front part of the rear vehicle-body structure 1.

The rear vehicle-body structure 1 of the present embodiment is applied to an automotive vehicle equipped with a so-called two-row seats comprising a front seat and a rear seat. The floor panel 10 forms a front part of the floor surface in the cabin which is positioned in front of a rear seat 2 (see FIG. 3).

Each of the side sills 20, 20 comprises a side sill inner 21 which is positioned on an inward side, in the vehicle width direction, of a vehicle body and has a hat-shaped cross section and a side sill outer (not illustrated) which is positioned on an outward side, in the vehicle width direction, of the vehicle body, which are joined together in the vehicle width direction so as to form a closed cross section extending in the vehicle longitudinal direction. A cross section of the side sill 20 which is perpendicular to the vehicle longitudinal direction is substantially rectangular, for example.

A tunnel portion 11 as a vehicle-body structure body which protrudes upwardly and extends in the vehicle longitudinal direction is provided at a central portion, in the vehicle width direction, of the floor panel 10. A front end portion of the tunnel portion 11 is connected to a dash panel (not illustrated) which partitions a front end portion of the cabin at a forward position. Tunnel reinforcing members 12, 12 which extend in the vehicle longitudinal direction are attached to both-side edge portions, in the vehicle width direction, of an upper surface of the tunnel portion 11.

Figure 6:
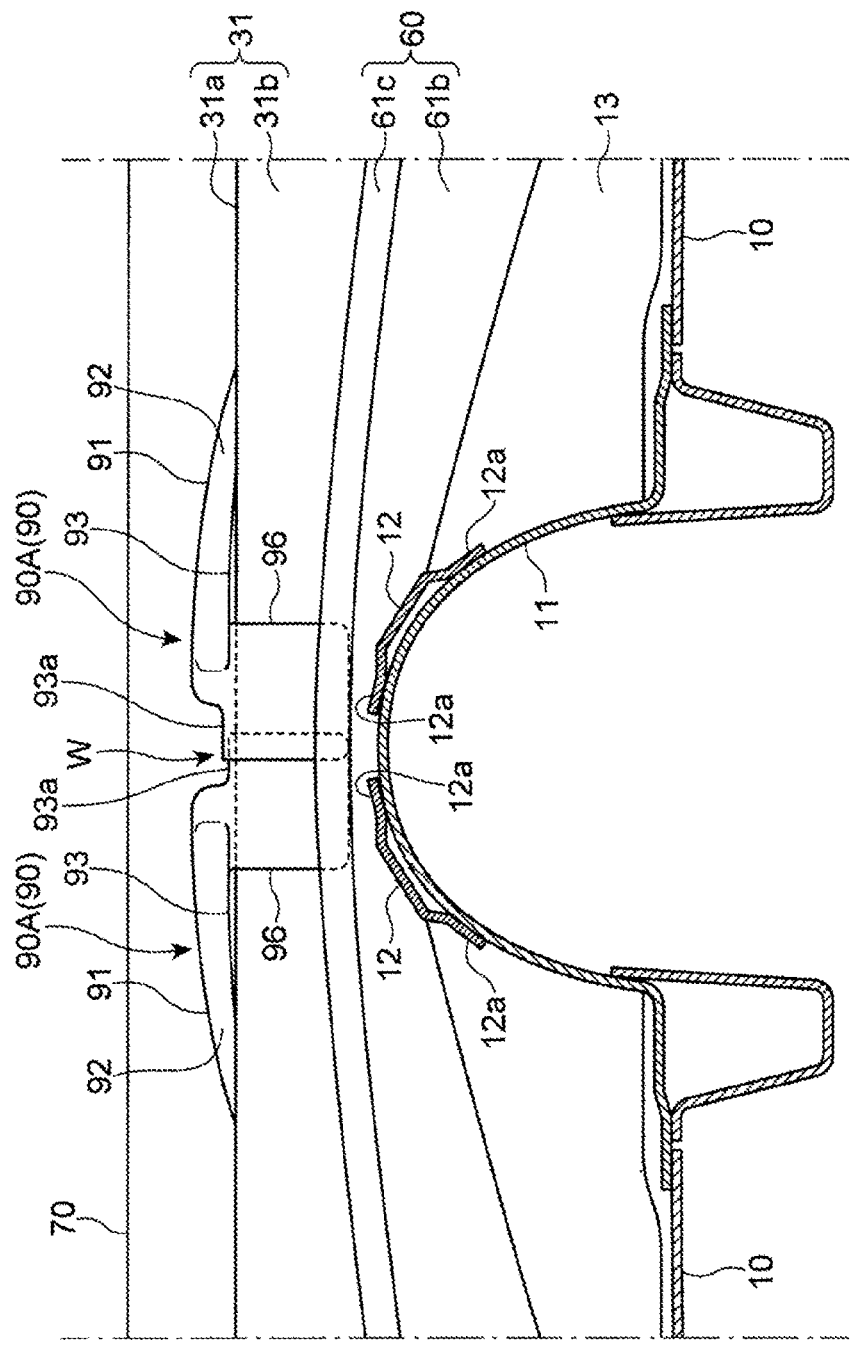
FIG. 6 is an enlarged elevational-sectional view taken along line B-B of FIG. 2, which shows the joining section of the right-and-left reinforcing member.

As shown in FIG. 6, each of the tunnel reinforcing members 12, 12 is configured to have a hat-shaped cross section which is perpendicular to the vehicle longitudinal direction and opened downwardly, and joined to the upper surface of the tunnel portion 11 from an upward side at a pair of lower-end flanges 12a which are provided at a lower end of the tunnel reinforcing member 12. Accordingly, the tunnel reinforcing member 12 forms a closed cross section extending in the vehicle longitudinal direction between the upper surface of the tunnel portion 11 and the tunnel reinforcing member 12, thereby effectively increasing the rigidity of the tunnel portion 11 (particularly, the bending rigidity, in a vertical direction, of the tunnel portion 11 and the bending rigidity, in a lateral direction, of the tunnel portion 11).

As shown in FIG. 1, the rear vehicle-body structure 1 comprises a rear floor panel 30 which is provided to be continuous to a rear part of the floor panel 10. The rear floor panel 30 is rearwardly continuous to the floor panel 10 via a kick-up portion 13 as a vertical-face part which rises upwardly from a rear edge portion of the floor panel 10. A front edge portion of the rear floor panel 30 is connected to an upper edge portion of the kick-up portion 13 via a cross member 60 which will be described later. The rear floor panel 30 is located at a higher level than the side sill 20 in the vertical direction.

Figure 2:
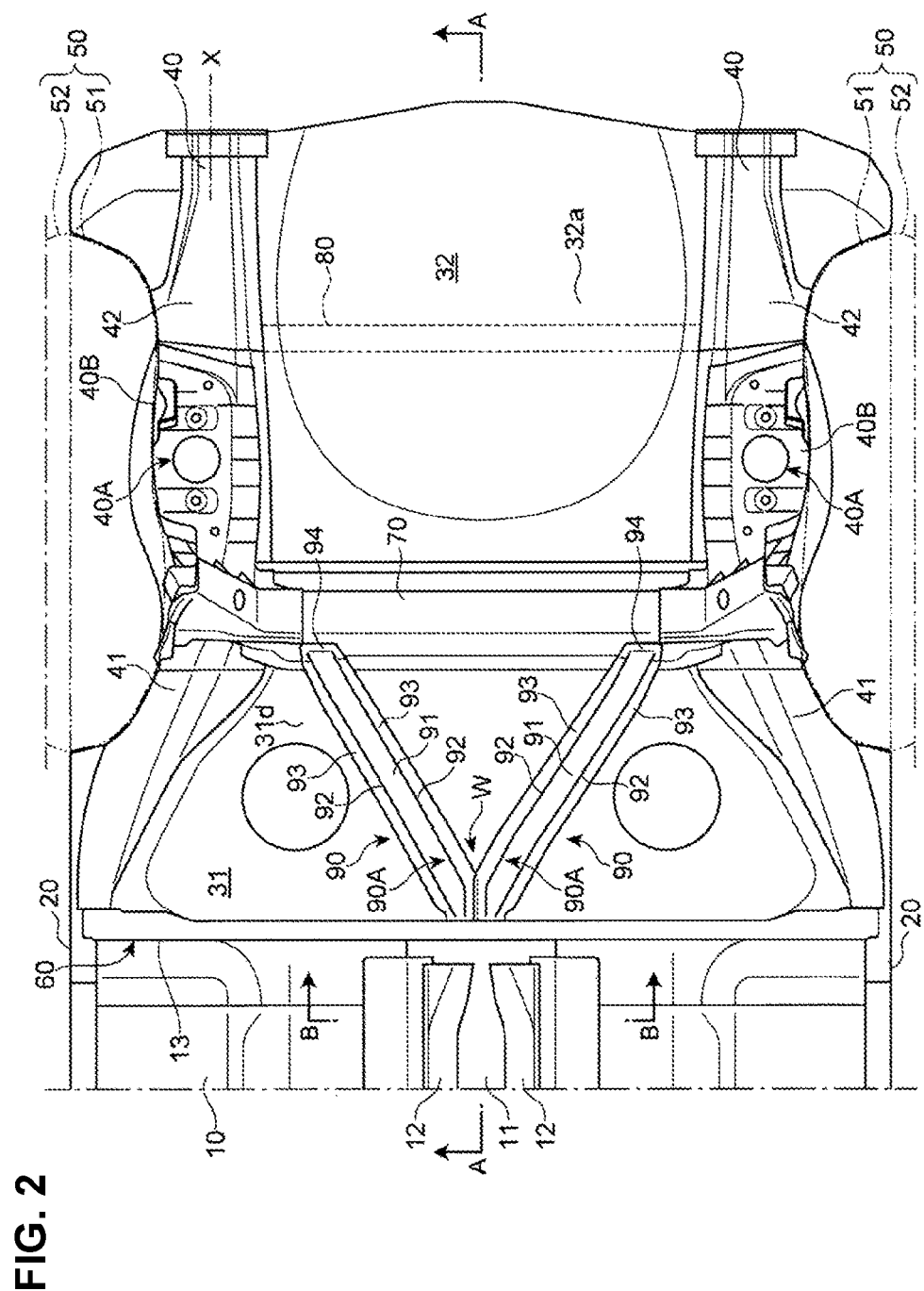
FIG. 2 is a plan view showing the rear vehicle-body structure according to the embodiment of the preset embodiment.

As shown in FIG. 2, a right-and-left rear frame 40, 40 which extend in the vehicle longitudinal direction are provided at both-sides, in the vehicle width direction, of the rear floor panel 30, and a rear wheel house 50 is adjacently provided on the outward side, in the vehicle width direction, of the right-and-left rear frame 40, 40.

The rear wheel house 50 comprises a wheel house inner 51 which protrudes inwardly in the vehicle width direction and a wheel house outer 52 which protrudes outwardly in the vehicle width direction, which are joined together in the vehicle width direction at their upper edge portions. A lower edge portion of the wheel house inner 51 is joined to the rear frame 40 from the outward side in the vehicle width direction.

The rear frame 40 is made of plural frame members which form a closed cross section extending continuously in the vehicle longitudinal direction. The rear frame 40 extends in the vehicle longitudinal direction from the kick-up portion 13 to the a rear end of the rear floor panel 30. A front end portion of the rear frame 40 is connected to a rear portion of the side sill 20.

The rear frame 40 is positioned on the inward side, in the vehicle width direction, of the side sill 20. Specifically, the rear frame 40 is positioned on the inward side, in the vehicle width direction, of the rear wheel house 50, and the side sill 20 is located substantially at the same position as the rear wheel house 50 in the vehicle width direction.

The rear frame 40 comprises a parallel part 42 where the members extend in the vehicle longitudinal direction substantially in parallel and a slant part 41 which extends obliquely forwardly-and-outwardly in the vehicle width direction from a front end portion of the parallel part 42. The rear frame 40 is connected to a rear end portion of the side sill 20 at a front end portion of the slant part 41.

The parallel part 42 of the rear frame 40 is provided with a suspension support portion 40A where a rear suspension (not illustrated) is attached from a downward side. Further, a rear-frame reinforcing member 40B to reinforce the suspension support portion 40A is attached to the rear frame 40.

Herein, the suspension support portion 40A is required to have a sufficient area for securing support of the suspension. Therefore, the parallel part 42 of the rear frame 40 of the present embodiment is configured to be wide, compared to a conventional rear frame which has no performance of suspension supporting. Thereby, the parallel part 42 of the rear frame 40 is provided at an inwardly-offset position in the vehicle width direction, compared to the conventional rear frame.

That is, in the present embodiment, since the rear frame 40 is configured such that a position of its axis X extending in a longitudinal direction (the vehicle longitudinal direction) is inwardly offset, in the vehicle width direction, from that of the conventional rear frame, the inwardly-offset amount of the rear frame 40 from the side sill 20 is larger than that of the conventional rear frame.

As described above, the rear frame 40 is connected to the side sill 20 at the front end portion of the slant part 41. Accordingly, even in the structure in which the rear frame 40 is inwardly offset from the side sill 20 as described above, the front end of the rear frame 40 can be smoothly connected to the rear portion of the side sill 20. Accordingly, in a case where a collision load is inputted from a vehicle-body rear part, the collision load can be efficiently transmitted from the side sill 20 to the rear frame 40.

Figure 3:
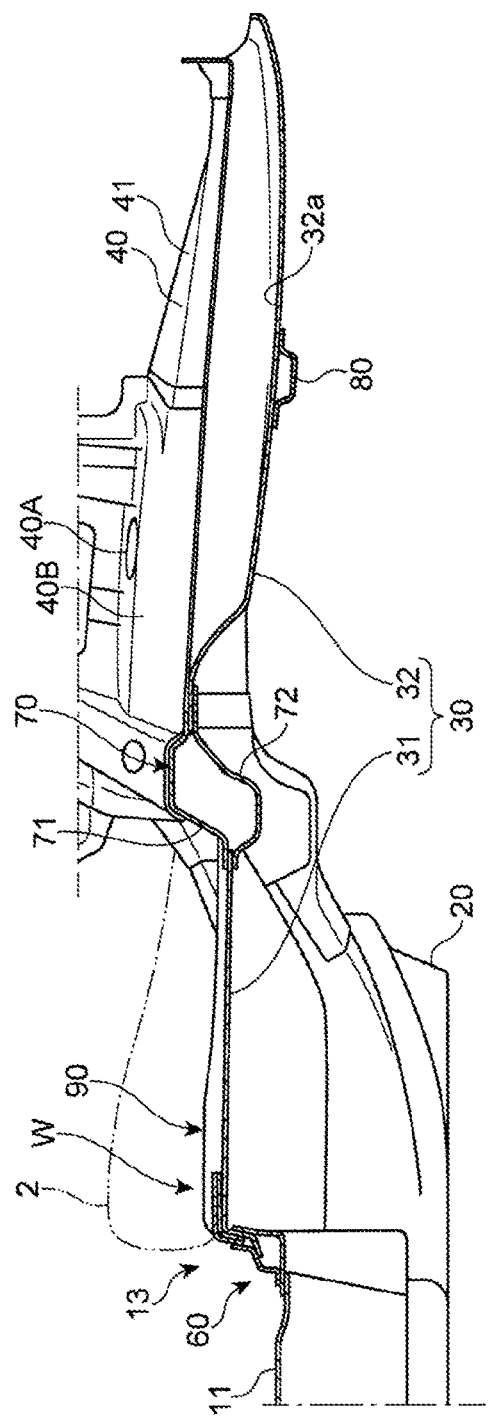
FIG. 3 is a sectional view of the rear vehicle-body structure taken along line A-A of FIG. 2.

As shown in FIG. 3, the rear floor panel 30 comprises a rear-floor front part 31 which is connected to an upper edge portion of the kick-up portion 13 and a rear-floor rear part 32 which is positioned on a rearward side of the rear-floor front part 31.

Figure 4:
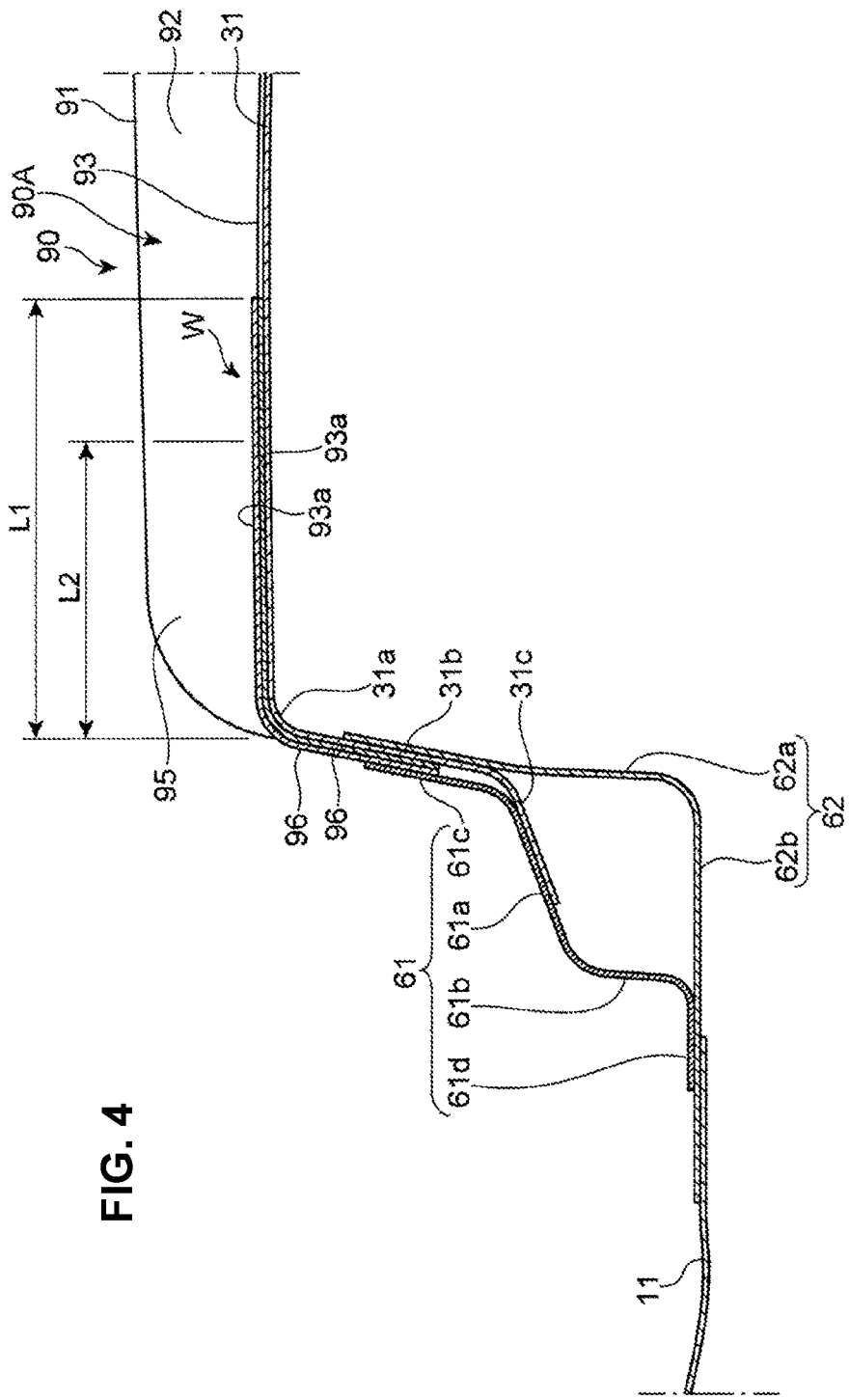
FIG. 4 is a partially-enlarged sectional view of FIG. 3, which shows a joining section of a right-and-left reinforcing member.

A fuel tank (not illustrated) is attached to a lower side of the rear-floor front part 31, and the rear seat 2 is attached to an upper side of the rear-floor front part 31. As shown in FIG. 4, at a front end portion of the rear-floor front part 31 are formed a rear-floor corner portion 31a which is curved forwardly and downwardly, a rear-floor vertical face portion 31b which extends downwardly from a lower end portion of the rear-floor corner portion 31a, and a rear-floor forward extension portion 31c which is curved forwardly from a lower end portion of the rear-floor vertical face portion 31b.

As shown in FIGS. 1 through 3, the rear-floor rear part 32 is located at a higher level than the rear-floor front part 31 in the vehicle vertical direction, and connected to a rear edge portion of the rear-floor front part 31 via a rear cross member 70 which will be described later. The rear-floor rear part 32 forms the floor surface of the cabin primarily. A recess portion 32a which is configured to be concaved downwardly is integrally formed at a central portion, in the vehicle width direction, of the rear-floor rear part 32. While this recess portion 32a is used as a spare tire pan for storing a spare tire, this is usable as a storage space for any other parts as well.

The rear vehicle-body structure 1 comprises the cross member 60, the rear cross member 70, and a spare-tire-pan cross member 80 which all extend in the vehicle width direction along the rear floor panel 30.

As shown in FIGS. 2 and 3, the cross member 60 extends in the vehicle width direction along the front end portion of the rear-floor front part 31, and interconnects the right-and-left side sills 20 in the vehicle width direction. A rear end portion of the tunnel portion 11 is connected to a front end portion of the cross member 60.

As shown in FIG. 1, the cross member 60 extends in the vehicle width direction and joined to respective rear portions of the side sills 20, 20 from the inward side at both end portions, in the vehicle width direction, thereof. The cross member 60 is curved such that a central portion, in the vehicle width direction, thereof protrudes upwardly in a front view, and extends obliquely downwardly-and-outwardly, in the vehicle width direction, from this central portion. Thereby, a central portion, in the vehicle width direction, of the front end portion of the rear-floor front part 31 can be connected to side sills 20, 20 which is located at the lower level than this central portion via the cross member 60.

As shown in FIG. 4, the cross member 60 comprises a cross member upper 61 and a cross member lower 62. The cross member upper 61 comprises an upper face portion 61a which is provided to overlap an upper surface of the rear-floor forward extension portion 31c and a front face portion 61b which extends downwardly from a front end portion of the upper face portion 61a. Further, the cross member upper 61 comprises a rear flange portion 61c which extends upwardly from a rear end portion of the upper face portion 61a and a front flange portion 61d which extends forwardly from a lower end portion of the front face portion 61b.

Herein, the front flange portion 61d is formed only at the central portion, in the vehicle width direction, of the cross member upper 61 so as to correspond to the tunnel portion 11 (see FIG. 1). The front face portion 61b is joined to a front face of the upper edge portion of the kick-up portion 13 in an area of the cross member upper 61 where the front flange portion 61d is not provided.

The cross member upper 62 comprises a rear face portion 62a which is provided to overlap a rear face of the rear-floor vertical face portion 31b and a lower face portion 62b which extends forwardly from a lower end portion of the rear face portion 62a. A front end portion of the lower face portion 62b is joined to the tunnel portion 11 at a central portion, in the vehicle width direction, thereof.

Herein, a lower end flange portion (not illustrated) which extends downwardly from the front end portion of the lower face portion 62b and is joined to a rear face of the upper edge portion of the kick-up portion 13 is provided at a portion of the cross member lower 62 which is offset, in the vehicle width direction, from the tunnel portion 11.

The cross member 60 is formed by joining the cross member upper 61 and the cross member lower 62 in the longitudinal direction and in the vertical direction. Specifically, the rear flange portion 61c of the cross member upper 61 is joined, by spot welding, to the rear face portion 62a of the cross member lower 62 from the forward side. Moreover, the front flange portion 61d of the cross member upper 61 is joined, by spot welding, for example, to the lower face portion 62b of the cross member lower 62 from the upward side.

Thereby, the cross member 60 has a substantially rectangular-shaped closed cross section extending in the vehicle width direction which is formed by the upper face portion 61a and the front face portion 61b of the cross member upper 61 and the rear face portion 62a and the lower face portion 62b of the cross member lower 62.

Herein, the lower face portion 62b of the cross member lower 62 extends forwardly beyond the front flange portion 61d of the cross member upper 61 joined thereto, and the tunnel portion 11 is joined to this end portion from the downward side by spot welding, for example.

As shown in FIGS. 1 through 3, the rear cross member 70 extends in the vehicle width direction along the rear end portion of the rear-floor front part 31 and interconnects respective rear end portions of the slant parts 41, 41 of the right-and-left rear frames 40, 40.

As shown in FIG. 3, the rear cross member 70 comprises a rear-cross member upper 71 which is joined to the upper surface of the rear floor panel 30 and a rear-cross member lower 72 which is joined to a lower surface of the rear floor panel 30. The rear-cross member upper 71 and the rear-cross member lower 72 respectively extend in the vehicle width direction and are joined to the respective slant parts 41 of the right-and-left rear frames 40 from the inward side in the vehicle width direction, thereby interconnecting the rear frames 40, 40 in the vehicle width direction (see FIGS. 1 and 2).

The rear-cross member upper 71 is configured to have a hat-shaped cross section which is perpendicular to the vehicle width direction and opened downwardly, and joined to the rear floor panel 30 from the upward side over a range from the rear-floor front part 31 to the rear-floor rear part 32. The rear-cross member lower 72 is configured to have a hat-shaped cross section which is perpendicular to the vehicle width direction and opened upwardly, and joined to the rear floor panel 30 from the downward side over a range from the rear-floor front part 31 to the rear-floor rear part 32. A closed cross section extending in the vehicle width direction is formed between the rear-cross member upper 71 and the rear-cross member lower 72.

As shown in FIGS. 2 and 3, the spare-tire-pan cross member 80 extends in the vehicle width direction along a lower surface of the recess portion 32a of the rear-floor rear part 32, and interconnect the right-and-left rear frames 40, 40 in the vehicle width direction. The spare-tire-pan cross member 80 is configured to have a hat-shaped cross section which is perpendicular to the vehicle width direction and opened upwardly, and forms a substantially-rectangular closed cross section extending in the vehicle width direction between the lower surface of the rear-floor rear part 32 (the recess portion 32a) and the spare-tire-pan cross member 80.

Further, as shown in FIGS. 1 and 2, a right-and-left reinforcing member 90, 90 which respectively connects the cross member 60 and the rear cross member 70 in the vehicle longitudinal direction is provided at the upper surface of the rear-floor front part 31. The right-and-left reinforcing member 90, 90 extends forwardly and inwardly from both end portions of the rear cross member 70 toward the central portion, in the vehicle width direction, of the cross member 60. Respective front end portions of the right-and-left reinforcing member 90, 90 are positioned adjacently to each other in the vehicle width direction. Thereby, the right-and-left reinforcing member 90, 90 is arranged in a nearly V shape as a whole in the plan view.

Each of these reinforcing member 90, 90 is configured to have a hat-shaped cross section which is opened downwardly. Specifically, the reinforcing member 90 comprises an upper face portion 91 which extends in a longitudinal direction of the reinforcing member 90 substantially along a horizontal surface (a surface nearly parallel to a vehicle-body horizontal surface) and a pair of right-and-left side face portions 92, 92 which extend obliquely downwardly-and-outwardly from both edge portions, in the vehicle width direction, of the upper surface portion 91 such that a distance therebetween (width) becomes wider toward the downward side. A body portion 90A of the reinforcing member 90 is constituted by the upper face portion 91 and the right-and-left side face portion 92, 92. The reinforcing member 90 further comprises a pair of lower-end frame portions 93, 93 which respectively extend outwardly, in the vehicle width direction, along the upper surface of the rear-floor front part 31 from respective lower edge portions of the side face portions 92, 92.

The reinforcing member 90 is joined to the rear-floor front part 31 by spot welding, for example, from the upward side at the pair of lower end flange portions 93, 93. Thereby, the body portion 90A of the reinforcing member 90 forms a closed cross section extending obliquely forwardly-and-inwardly between the rear-floor front part 31 and this body portion 90A.

Herein, as shown in FIG. 1, a pair of rear-floor slant portion 31d, 31d which respectively extend obliquely rearwardly-and-downwardly are provided at both-side portions of the rear-floor front part 31 which are positioned on the rearward side of its front end portion and on the both sides of its central portion in the vehicle width direction. Meanwhile, since the upper face portion 91 of the reinforcing member 90 extends substantially horizontally, the hat-shaped cross section of the reinforcing member 90 is configured such that a rear side part thereof which is joined to the rear-floor slant portion 31d becomes gradually larger, in the vertical direction, as it goes rearwardly.

As shown in FIGS. 1 and 2, a rear-end flange portion 94 is provided at a rear end portion of the reinforcing member 90. The rear-end flange portion 94 is provided to extend upwardly and in the vehicle width direction toward an outside of the hat-shaped cross section from respective rear edge portions of the upper face portion 91 and the pair of side face portions 92, 92. A pair of lower edge portions of the rear-end flange portion 94 are bent forwardly and continuous to the lower-end flange portion 93. The reinforcing member 90 is joined, by spot welding, for example, to an outward-side end portion, in the vehicle width direction, of a front face of the rear cross member 70 via the rear-end flange portion 94 at its rear end portion.

At the rear end portion of the reinforcing member 90, the size, in the vertical direction, of the body portion 90A is larger than that, in the width direction (in the horizontal direction perpendicular to the longitudinal direction), of the body portion 90A, whereby a sufficiently-large area of the closed cross section of the body portion 90A is secured. At the front end portion of the reinforcing member 90, the size, in the vertical direction, of the body portion 90A is smaller than that, in the width direction of the body portion 90A, whereby suppression of the projection amount (degree) of the reinforcing member 90 protruding from the upper surface of the rear-floor front part 31 is achieved, and thereby enlargement of the living space, in the vehicle vertical direction, of the rear seat is achieved.

Figure 5:
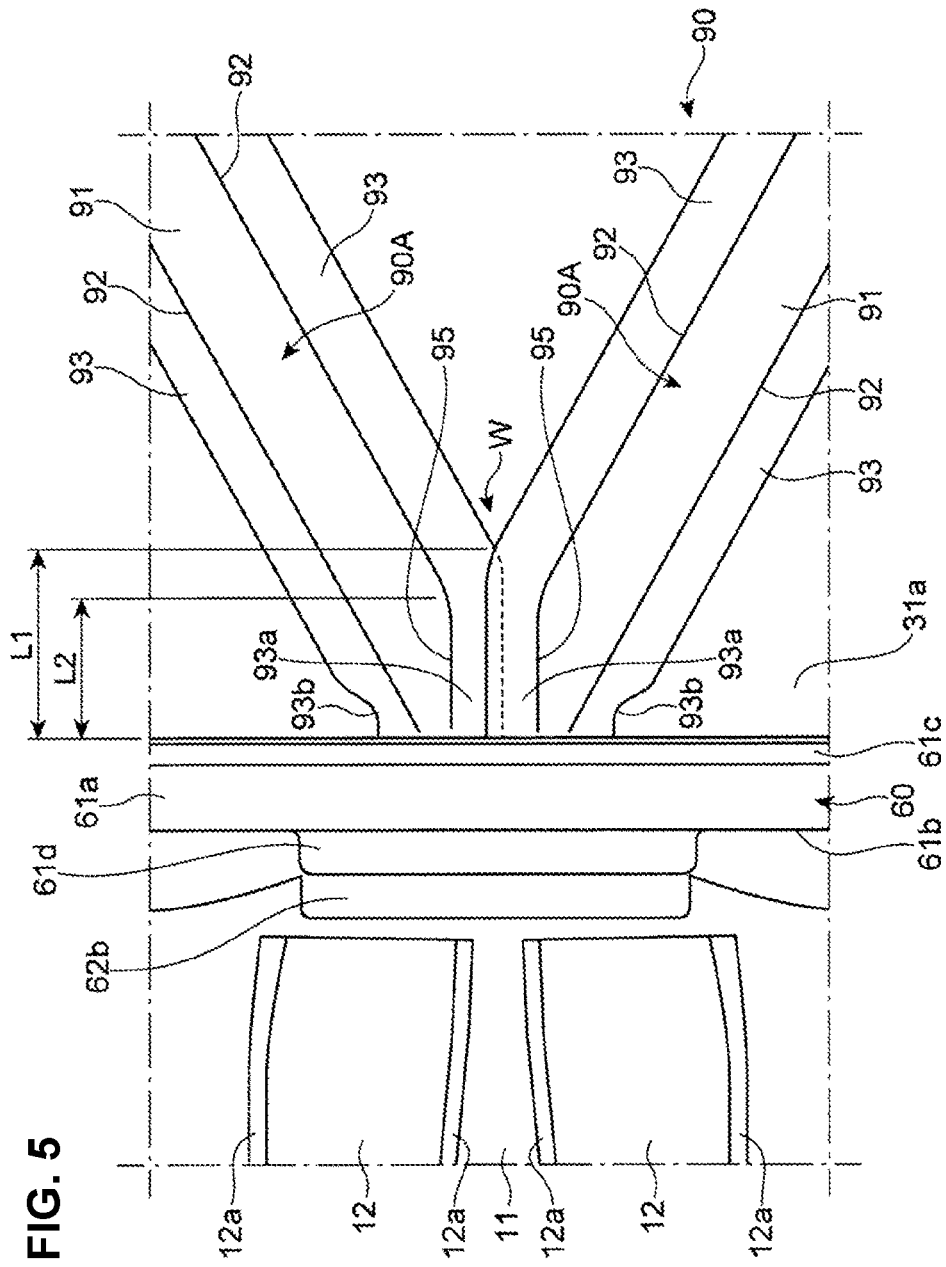
FIG. 5 is a partially-enlarged plan view of FIG. 2, which shows the joining section of the right-and-left reinforcing member.

As shown in FIG. 5, the respective front end portions of the body portions 90A, 90A of the right-and-left reinforcing member 90, 90 are provided with opposed-face portions 95, 95 which face each other in the vehicle width direction. The opposed-face portions 95, 95 are provided at respective front end portions of the inward-side side face portions 92, 92, in the vehicle width direction, of the body portions 90A, 90A. The opposed-face portions 95, 95 are arranged in parallel in the vehicle longitudinal direction, having a gap, in the vehicle width direction, therebetween. A distance, in the vehicle width direction, of the opposed-face portions 95, 95 is nearly equal to or smaller than the size of a portion of the upper face portion 91 which is positioned on the rearward side of the opposed-face portion 95.

The size, in the width direction, of the upper face portion 91 (the size, in a direction perpendicular to the longitudinal direction, of the upper face portion 91) of the reinforcing member 90 is nearly constant in a longitudinal area except an area where the opposed-face portion 95 is provided. Meanwhile, the size, in the width direction, of the upper face portion 91 becomes smaller as it goes forwardly in the longitudinal area where the opposed-face portion 95 is provided.

As described above, since the reinforcing member 90, 90 is provided with respective bent portions which are positioned closely to the front ends of the inward-side side face portions 92, 92, the member 90, 90 has the opposed-face portions 95, 95 which are arranged in parallel to each other at respective portions of the reinforcing member 90, 90 which are positioned on the forward side of the bent portions. Accordingly, the distance of the respective front end portions of the right-and-left reinforcing member 90, 90 can be positioned properly closely, comparted to a case where the inward-side side face portion 92 of the reinforcing member 90 is arranged obliquely over its whole length, that is, a case where the front end portions of the reinforcing member 90, 90 are not provided with any opposed-face portions which are arranged in parallel to each other.

The respective front end portions of the inward-side lower-end flange portions 93, 93 of the right-and-left reinforcing member 90, 90 are provided with parallel portions 93a, 93a which extend in the vehicle longitudinal direction in parallel along the opposed-face portions 95, 95. The size, in the width direction, of the parallel portion 93a (i.e., the width of the parallel portion 93a) is equal to or smaller than that of another portion of the lower-end flange portion 93 than the parallel portion 93a. The right-and-left parallel portions 93a, 93a overlap each other between the right-and-left opposed-face portions 95, 95 and joined to the rear-floor front part 31.

Thus, at the respective front end portions of the right-and-left reinforcing member 90, 90 are formed an overlap joint section W where the lower-end flange portions 93, 93 overlap each other and joined to the rear-floor front part 31. The rear-floor front part 31 and the pair of lower-end flange portions 93, 93 are joined together by spot welding, for example, in a three-layer overlapping state at the overlap joint section W. Accordingly, the right-and-left reinforcing member 90, 90 are joined together at the lower-end flange portions 93, 93, and this connection portion is reinforced by the rear-floor front part 31.

As shown in FIG. 5, the overlap joint section W is configured to extend in the vehicle longitudinal direction along the opposed-face portions 95, 95 and such that its longitudinal length L1 is longer than a longitudinal length L2 of the opposed-face portion 95. Thereby, the connection strength of the reinforcing member 90, 90 can be effectively increased.

As shown in FIGS. 1 and 5, since the overlap joint section W is formed at the rear-floor corner portion 31a of the rear floor panel 30 which has the relatively high rigidity because of its downwardly-curved structure as described above, the rigidity of the overlap joint section W of the reinforcing member 90, 90 is effectively increased.

Further, as shown in FIGS. 4 and 6, a front-end flange portion 96 as a downward-extension portion is formed at the front end portion of the reinforcing member 90, 90. The front-end flange portion 96 is configured to extend downwardly from a front edge portion of the upper face portion 91 and respective front edge portions of the pair of lower-end flange portions 93, 93. The front-end flange portion 96 is arranged along a face perpendicular to the vehicle longitudinal direction. An upper-side portion of the front-end flange portion 96 which is located at a higher level than the lower-end flange portion 93 covers a front-end opening of the body portion 90A of the reinforcing member 90. A lower-side portion of the front-end flange portion 96 which is located at a lower level than the lower-end flange portion 93 extends downwardly along the rear-floor vertical face portion 31b. Herein, a notch portion 93b (see FIG. 5) is formed at an outward side, in the vehicle width direction, of the front end portion of the lower-end flange portion 93 so that the lower-end flange portion 93 can be easily bent along the rear-floor corner portion 31*a*.

The front-end flange portions 96, 96 are interposed, in the longitudinal direction, between the rear flange portion 61*c* of the cross member upper 61 and the rear-floor vertical face portion 31*b*. The reinforcing member 90 is joined to the rear flange portion 61*c* of the cross member upper 61, the rear-floor vertical face portion 31*b*, and the rear face portion 62*a* of the cross member lower 62 by spot welding, for example.

As described above, the front-end flange portions 96, 96 are formed continuously to the lower-end flange portions 93, 93, and these portions 96, 96 overlap each other at a position, in the vehicle width direction (the vehicle-body central position), which corresponds to the parallel portions 93*a*, 93*a* of the lower-end flange portions 93, 93. The overlapping portions of the par of front-end flange portions 96, 96 constitutes a part of the above-described overlap joint section W.

Accordingly, at the front end portion of the central portion, in the vehicle width direction, of the rear floor panel 30, the rear flange portion 61*c* of the cross member upper 61, the front-end flange portions 96, 96 of the reinforcing member 90, 90, the rear-floor vertical face portion 31*b*, and the rear face portion 62*a* of the cross member lower 62 are joined together, in this order from the forward side, by spot welding, for example, in a five-layer overlapping state.

Next, an operation (move) of the rear vehicle-body structure 1 according to the present embodiment when the collision load is inputted thereto from the vehicle-body rear part will be described.

First, the collision load inputted to the right-and-left rear frames 40, 40 from the vehicle-body rear part is transmitted to the side sills 20, 20, and also transmitted to the tunnel portion 11 extending forwardly by way of the rear cross member 70, the right-and-left reinforcing member 90, 90, and the cross member 60.

As shown in FIG. 2, the load path which extends from the slant part 41 of the rear frame 40 up to the rear cross member 70 is created having an acute angle. In particular, in the structure of the present embodiment in which the parallel part 42 of the rear frame 40 is positioned at the more inward side compared to the conventional one, the slant angle of the slant part 41 of the rear frame 40 relative to the parallel part 42 tends to be larger, so that it is likely that the angle which the slant part 41 makes with the rear cross member 70 is smaller. Therefore, if no effective reinforcement measures is taken, the both end portions, in the vehicle width direction, of the rear cross member 70 is so easily bent so as to be displaced forwardly that there may occur a loss in transmission of the collision load toward the vehicle-body front part.

In this regard, since the right-and-left reinforcing member 90, 90 of the present embodiment is joined to the front faces of the both end portions, in the vehicle width direction, of the rear cross member 70, the both end portions of the rear cross member 70 which are the joint portions thereof to the slant parts 41 of the rear frames 40, 40 are supported by the right-and-left reinforcing member 90, 90 from the forward side. Accordingly, even if the collision load is applied from the vehicle-body rear part, it is suppressed that the both end portions of the rear cross member 70 are displaced forwardly. Thereby, the above-described bending of the rear cross member 70 is so effectively suppressed that the collision load from the vehicle-body rear part can be efficiently transmitted to the vehicle-body front part by way of the rear cross member 70 and the right-and-left reinforcing member 90, 90.

Further, the right-and-left reinforcing member 90, 90 is arranged in the V shape in the plan view such that their forward sides approach closely to each other, and the front end portions of the right-and-left reinforcing member 90, 90 are positioned so as to face the rear part of the tunnel portion 11 via the cross member 60. Thereby, the collision load inputted from vehicle-body rear part is effectively transmitted from the right-and-left rear frames 40, 40 to the tunnel portion 11 positioned at the central portion in the vehicle width direction by way of the V-shaped reinforcing members 40, 40. Accordingly, the collision load inputted from the vehicle-body rear part is efficiently dispersed to the vehicle-body front part.

Herein, the connection position of the cross member 60 and the right-and-left reinforcing member 90, 90 is located on an upstream side of the connection position of the cross member 60 and the right-and-left side sills 20, 20. Since these connection positions are offset in the vertical direction, when the collision load is transmitted to the cross member 60 by way of the reinforcing member 90, 90, it is likely that the cross member 60 is displaced such that it falls down forwardly around its axial center passing its both end portions connected to the side sills 20, 20. Therefore, when the collision load from the vehicle-body rear part has been transmitted to the cross member 60, it is suppressed that the cross member 60 collapses, so that the collision load is efficiently transmitted from the cross member 60 to the tunnel portion 11.

Further, as shown in FIG. 5, when the collision load is inputted from the vehicle-body rear part, an inward element, in the vehicle width direction, of the load, in addition to a forward element of the load, acts on a joining section of the right-and-left reinforcing member 90, 90 extending obliquely forwardly-and-inwardly from the rear cross member 70 toward the tunnel portion 11.

A vehicle-width-directional element of the load can be transmitted between the right-and-left reinforcing member 90, 90 through the overlap joint section W. Accordingly, the vehicle-width-directional element of the load can be dispersed or offset (cancelled) between the right-and-left reinforcing member 90, 90.

Since the overlap joint section W is provided to cross over the rear-floor corner portion 31*a* at the front end portion of the rear floor panel 30, the rigidity of the overlap joint section W is increased effectively. Accordingly, the efficiency of the load transmission between the reinforcing member 90, 90 by way of the overlap joint section W can be improved. Further, since the lower end portion of the overlap joint section W is connected to the cross member 60, the load can be efficiently transmitted from the reinforcing member 90, 90 to the tunnel portion 11 located at the lower level than the reinforcing member 90, 90 by way of the overlap joint section W having the high rigidity and the cross member 60 having the high rigidity.

As described above, the right-and-left reinforcing member 90, 90 are connected at the overlap joint section W which is provided at the lower-end flange portions 93, 93 of their front end portions and the front-end flange portions 96, 96. Accordingly, the connection portion of the right-and-left reinforcing member 90, 90 can be made properly simple and compact without using any other parts, such as the connecting member. Thereby, the connection portion of the right-and-left reinforcing member 90, 90 where the respective collision loads transmitted to the right-and-left reinforcing member 90, 90 from the vehicle-body rear part join can be strengthened and also the flexibility of layout of parts and the like which are arranged around this connection portion can be improved. Thus, in a case where the rear seat is arranged above the right-and-left reinforcing member 90, 90, it is likely that the living space of the rear seat provided above the right-and-left reinforcing member 90, 90 and the thickness, in the vertical direction, of the seat cushion (see FIG. 3) of the rear seat 2 can be secured sufficiently.

The present disclosure should not be limited to the above-described embodiment and any other modifications or improvements may be applied within the scope of a spirit of the present disclosure.

For example, while the present embodiment is configured such that the right-and-left reinforcing member 90, 90 are connected to the tunnel portion 11 via the cross member 60, the front-end flange portions 96, 96 of the reinforcing member 90, 90 may be configured to extend forwardly and the reinforcing member 90, 90 may be directly connected to the tunnel portion 11.

As described above, since the rear vehicle-body structure according to the present disclosure can firmly connect the right-and-left reinforcing member for creating the load path of the collision load from the vehicle-body rear part and also make the structure of the connecting member properly simple and compact, this structure is properly usable in a field of this kind of production technology.

What is claimed is:

1. A rear vehicle-body structure, comprising:
a floor of the vehicle-body;
a right-and-left rear frame extending in a vehicle longitudinal direction on both sides of a rear of the floor;
a rear cross member extending in a vehicle width direction and interconnecting a front of the right-and-left rear frame; and
a right-and-left reinforcing member directly or indirectly connecting a tunnel portion provided in front of the rear cross member,
wherein the right-and-left reinforcing member is provided on the floor so as to extend forwardly and inwardly in the vehicle width direction from the rear cross member toward the tunnel portion, and respective front end portions of the right-and-left reinforcing member overlap each other and are joined to the floor.

2. The rear vehicle-body structure of claim 1, wherein
the right-and-left reinforcing member comprises a body portion which forms a closed cross section between the floor and the body portion, and a flange portion which is provided along a lower edge portion of the body portion and joined to the floor, and an overlap joint section of the right-and-left reinforcing member is formed at least at the flange portion of the right-and-left reinforcing member.

3. The rear vehicle-body structure of claim 2, wherein
a front end portion of the body portion of the right-and-left reinforcing member is provided with opposed-face portions which face each other in the vehicle width direction, and the overlap joint section of the right-and-left reinforcing member includes a part of the flange portion which extends in the vehicle longitudinal direction along the opposed-face portions.

4. The rear vehicle-body structure of claim 3, wherein the overlap joint section of the right-and-left reinforcing member is configured to be longer than the opposed-face portions in the vehicle longitudinal direction.

5. The rear vehicle-body structure of claim 1, wherein
the floor comprises a vertical-face part which is provided in front of the rear cross member so as to cross the vehicle longitudinal direction and a rear floor part which extends rearwardly from an upper edge portion of the vertical-face part and supports the rear cross member and the right-and-left reinforcing member,
the vehicle-body structure body extends forwardly from the vertical-face part of the floor,
the front end portion of the right-and-left reinforcing member is provided with a downward-extension portion which extends downwardly along the vertical-face part of the floor and is joined to the vertical-face part of the floor, and
the overlap joint section of the right-and-left reinforcing member is joined to the floor over a range from the rear floor part to the vertical-face part.

6. The rear vehicle-body structure of claim 2, wherein
the floor comprises a vertical-face part which is provided in front of the rear cross member so as to cross the vehicle longitudinal direction and a rear floor part which extends rearwardly from an upper edge portion of the vertical-face part and supports the rear cross member and the right-and-left reinforcing member,
the vehicle-body structure body extends forwardly from the vertical-face part of the floor,
the front end portion of the right-and-left reinforcing member is provided with a downward-extension portion which extends downwardly along the vertical-face part of the floor and is joined to the vertical-face part of the floor, and
the overlap joint section of the right-and-left reinforcing member is joined to the floor over a range from the rear floor part to the vertical-face part.

7. The rear vehicle-body structure of claim 3, wherein
the floor comprises a vertical-face part which is provided in front of the rear cross member so as to cross the vehicle longitudinal direction and a rear floor part which extends rearwardly from an upper edge portion of the vertical-face part and supports the rear cross member and the right-and-left reinforcing member,
the vehicle-body structure body extends forwardly from the vertical-face part of the floor,
the front end portion of the right-and-left reinforcing member is provided with a downward-extension portion which extends downwardly along the vertical-face part of the floor and is joined to the vertical-face part of the floor, and
the overlap joint section of the right-and-left reinforcing member is joined to the floor over a range from the rear floor part to the vertical-face part.

8. The rear vehicle-body structure of claim 4, wherein
the floor comprises a vertical-face part which is provided in front of the rear cross member so as to cross the vehicle longitudinal direction and a rear floor part which extends rearwardly from an upper edge portion of the vertical-face part and supports the rear cross member and the right-and-left reinforcing member,
the vehicle-body structure body extends forwardly from the vertical-face part of the floor,
the front end portion of the right-and-left reinforcing member is provided with a downward-extension portion which extends downwardly along the vertical-face part of the floor and is joined to the vertical-face part of the floor, and
the overlap joint section of the right-and-left reinforcing member is joined to the floor over a range from the rear floor part to the vertical-face part.

9. The rear vehicle-body structure of claim 5, further comprising
   a second cross member extending in the vehicle width direction along a front face of the vertical-face part of the floor, passing over the vehicle-body structure body, and the downward-extension portion is connected to the vehicle-body structure body via the second cross member.

10. The rear vehicle-body structure of claim 6, further comprising
    a second cross member extending in the vehicle width direction along a front face of the vertical-face part of the floor, passing over the vehicle-body structure body, and the downward-extension portion is connected to the vehicle-body structure body via the second cross member.

11. The rear vehicle-body structure of claim 7, further comprising
    a second cross member extending in the vehicle width direction along a front face of the vertical-face part of the floor, passing over the vehicle-body structure body, and the downward-extension portion is connected to the vehicle-body structure body via the second cross member.

12. The rear vehicle-body structure of claim 8, further comprising
    a second cross member extending in the vehicle width direction along a front face of the vertical-face part of the floor, passing over the vehicle-body structure body, and the downward-extension portion is connected to the vehicle-body structure body via the second cross member.

* * * * *